United States Patent

Neumann et al.

[11] Patent Number: 5,828,497
[45] Date of Patent: Oct. 27, 1998

[54] DICHROIC PENTAPRISM FOR SEPARATING OR COMBINING FREQUENCY BANDS OF ELECTROMAGNETIC ENERGY

[75] Inventors: Margarete Neumann, Penetanguishene; Robert Pursel, Victoria Harbor, both of Canada

[73] Assignee: Raytheon Company, Lexington, Mass.

[21] Appl. No.: 805,512

[22] Filed: Feb. 26, 1997

[51] Int. Cl.$^6$ ............................ G02B 27/14; G02B 01/10
[52] U.S. Cl. ............................................. 359/634; 359/583
[58] Field of Search .................................. 359/634, 583; 353/31, 34; 349/8, 9, 106

[56] References Cited

U.S. PATENT DOCUMENTS

| | | | |
|---|---|---|---|
| 3,905,684 | 9/1975 | Cook et al. | 359/633 |
| 4,857,997 | 8/1989 | Fukami et al. | 358/55 |
| 4,873,569 | 10/1989 | Hirosawa | 358/78 |
| 5,105,263 | 4/1992 | Shioda | 358/29 |
| 5,245,449 | 9/1993 | Ooi | 359/40 |
| 5,251,068 | 10/1993 | Oshima et al. | 359/634 |
| 5,644,432 | 7/1997 | Doany | 359/634 |
| 5,695,266 | 12/1997 | Kida et al. | 353/31 |

FOREIGN PATENT DOCUMENTS

| | | | |
|---|---|---|---|
| 0000914 | 1/1989 | Japan | 359/634 |
| 2089521 | 6/1982 | United Kingdom | 359/634 |

*Primary Examiner*—Georgia Y. Epps
*Assistant Examiner*—Ricky Mack
*Attorney, Agent, or Firm*—W. C. Schubert; G. H. Lenzen, Jr.

[57] ABSTRACT

A system (50) for separating and combining frequency bands (64, 74, 78) from a beam (62) of electromagnetic energy adapted for use with a beam of white light (62) having a first (64), second (74) and third (78) frequency band. The inventive system (50) includes a first surface (58) for transmitting the first frequency band (64) and reflecting the second (70, 78) and third (70, 74) frequency bands. A second surface (60) reflects the second frequency band (74) and transmits the third (78) frequency band. A transparent support structure (52, 54, 56) supports the first surface (58) and the second surface (60) in a pre-determined orientation that provides for a low angle of incidence (66, 72) of electromagnetic energy impinging on the first surface (58) and the second surface (60) to minimize undesirable polarization effects. In a specific embodiment, the angle (66, 72) is 22.5 degrees. The predetermined orientation includes the first surface (58) angled with respect to the second surface (60) so that the first (64), second (74), and third (78) frequency bands have first (64), second (74), and third (78) separate paths respectively. In the illustrative embodiment, the support structure (52, 54, 56) includes a glass pentaprism (52). The first surface (58) has a dichroic coating on a first lateral surface (58) of the pentaprism (52) and the second surface (60) has a dichroic coating on the other lateral surface (60). The support structure (52, 54, 56) further includes a first (54) and second (56) glass surface attachment attached to the first (58) and second (60) surface respectively.

21 Claims, 1 Drawing Sheet

DICHROIC PENTAPRISM FOR SEPARATING OR COMBINING FREQUENCY BANDS OF ELECTROMAGNETIC ENERGY

BACKGROUND OF THE INVENTION

1. Field of Invention

This invention relates to optics. Specifically, the present invention relates to optical devices used for separating white light into red, green, and blue light, and devices used for combining red, green, and blue light into white light.

2. Description of the Related Art

The principle of tristimulus colorimetry is used in optical imaging or display systems to generate the full range of colors. Most display systems utilize the red-green-blue tristimulus system in which any color is created from the appropriate combination of red, green, and blue. White light occupies part of the electromagnetic spectrum ranging from approximately $4.3 \times 10^{14}$ Hertz to $7.5 \times 10^{14}$ Hertz and within this spectrum blue and red light occupy the high and low frequency ends respectively while green represents the central frequency band of the visible spectrum.

Liquid Crystal Displays (LCDs) and reflective Digital Micromirror Devices (DMDs) generally employ three display panels, one each for red, green and blue.

Another application is in the area of head-up display systems in which information is projected on the windscreen of a automobile, plane or helicopter. These applications require compact optical components to provide separate beams of red, green, and blue light using either polarized or unpolarized white light as a source.

Certain display and imaging systems utilize the principle of thin film interference to separate frequency bands of white light to generate red, green, and blue. Specifically, color separation is often achieved using frequency sensitive optical multilayer coatings of dielectric materials applied to glass substrates. The tristimulus form of color separation of white light into red, green, and blue is accomplished when these coatings are applied to a number of color selective, i.e. dichroic, mirrors. The dichroic mirrors are then arranged in any number of configurations to create channels of red, green, and blue light. However, these arrangements are bulky and require expensive support structures to support the mirrors and lenses in the desired configuration. In addition, these arrangements require lenses with long back focal lengths when used in imaging systems.

To reduce bulkiness and the need for lenses with long back focal lengths, the dichroic coatings can be mounted inside a cubic glass beamsplitter at a 45 degree angle of incidence. Although the cubic beamsplitter is compact, the coatings cemented in glass at a 45 degree angle of incidence suffer certain limitations on performance. The performance problems include a sensitivity to the polarization and the angle of incidence of the incoming beam.

To reduce the sensitivity to polarization, it is desirable for the dichroic coatings to operate at a lower angle of incidence, usually less than 25 degrees. This may be affected using prism configuration as shown in FIG. 1. In FIG. 1, the dichroic coatings are oriented at an approximately 13 degree angle of incidence and utilize the principle of total internal reflection to split white light into red, green and blue light. Total internal reflection requires an air space between two of the prisms. However, this air space must be held to no greater than 0.010 millimeters to minimize aberrations in the image. The resulting prism cluster is difficult to manufacture since three different prisms are required and the airspace necessitates a more complex design and manufacturing procedure than that of a cemented interface. Due to the requirement of total internal reflection, incoming light that is not parallel to the axis of the system may be lost which will result in vignetting. (Vignetting is an undesirable shading around the edges of an image).

Hence, a need exists in the art for a cost effective, compact system that can cleanly split unpolarized white light into red, green, and blue light with minimal polarization and no vignetting.

SUMMARY OF THE INVENTION

The need in the art is addressed by the system for separating and combining frequency bands from a beam of electromagnetic energy of the present invention. In the illustrative embodiment, the inventive system is adapted for use with a beam of white light having first, second and third frequency bands and includes a first surface for transmitting the first frequency band and reflecting the second and third frequency bands. A second surface reflects the second frequency band and transmits the third frequency band. A transparent support structure supports the first surface and the second surface in a predetermined orientation that provides for a low angle of incidence of electromagnetic energy impinging on the first surface and the second surface ensuring that the third path is perpendicular to the first.

In a specific embodiment, the angle of incidence is 22.5 degrees. The predetermined orientation includes the first surface angled with respect to the second surface so that the first, second, and third frequency bands have first, second, and third separate paths respectively. The first surface is angled approximately forty-five degrees with respect to the second surface for minimizing undesirable polarization effects.

In the illustrative embodiment, the support structure includes a glass pentaprism. The first surface has a dichroic coating on a first lateral surface of the pentaprism and the second surface has a dichroic coating on the other lateral surface of the pentaprism. The support structure further includes a first and second glass surface attachment attached to the first and second surface respectively. The first, second, and third frequency bands correspond to red, green, and blue light respectively. The beam of electromagnetic energy is a beam of white light. A first surface on the pentaprism is perpendicular to the beam for minimizing undesirable beam distortion when the beam enters the pentaprism. The first, second, and third frequency bands pass through surfaces of the prism cluster perpendicular thereto.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a traditional three-color beamsplitter using a Phillips prism is intended to facilitate an understanding of the present invention.

Figure 1:
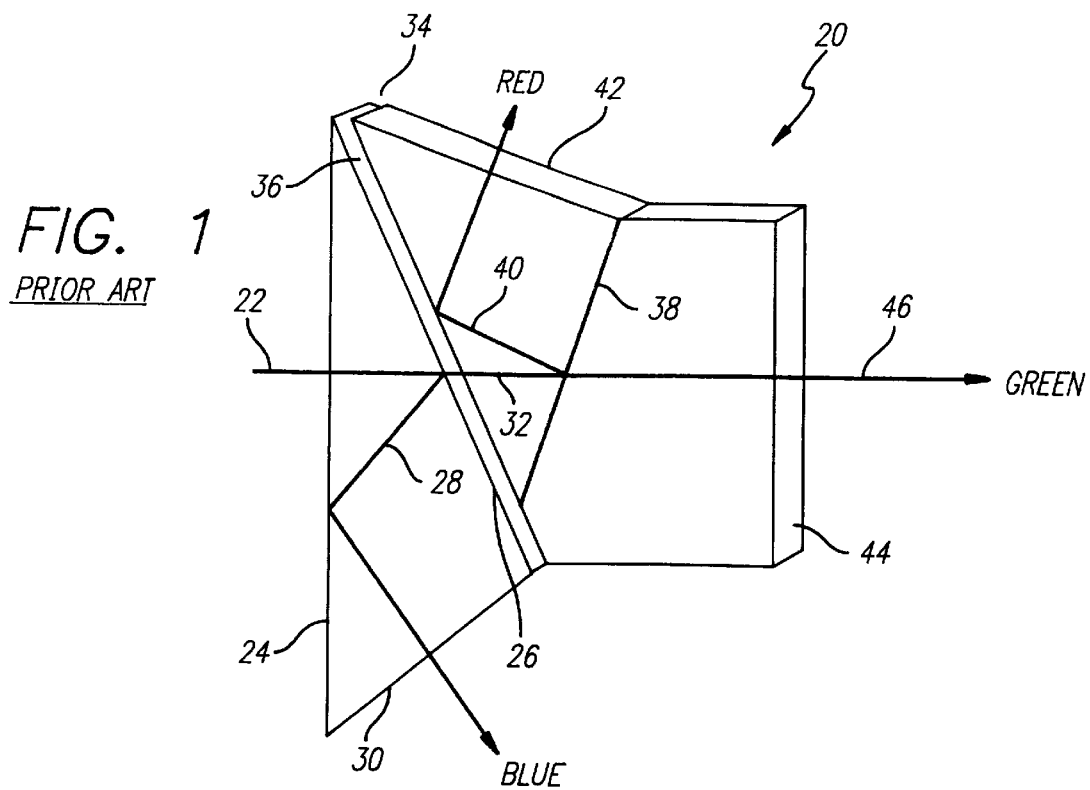
FIG. 1 is a diagram of a conventional dichroic beamsplitter using internally reflecting surfaces.

FIG. 1 is a diagram of a conventional dichroic beamsplitter 20 using internally reflecting surfaces. A beam of white light 22 enters the prism 20 perpendicular to a first surface 24. The white beam 22 impinges on a first blue-reflecting dichroic surface 26. Blue light separated from the white beam 22 forms a blue beam 28. The blue beam 28 is internally reflected by the surface 24. If the blue beam 28 is divergent and/or unpolarized it will often impinge on the surface 24 with an angle of incidence greater than the critical angle, resulting in a lack of total internal reflection at the surface 24. This results in vignetting and beam energy loss. The blue beam 28 exits the prism 20 perpendicular to a second surface 30 to minimize beam distortion.

Green and red light from the white beam 22 transmit through the surface 26 into a space 34 and form a green/red beam 32. The space 34 must be held to a small value of 0.010 millimeters to eliminate aberration effects. The green/red beam 32 enters third surface 36 at an angle other than 90°. This increases undesirable polarization effects on the green/red beam 32.

The green/red beam 32 impinges on a red-reflecting dichroic surface 38. Red light from the green/red beam 32 forms a red beam 40 that is internally reflected at the third surface 36. If the red beam 40 is divergent and/or unpolarized it will often impinge on the third surface 36 with an angle of incidence greater than the critical angle resulting in a lack of total internal reflection at the at the surface 36. This results in vignetting, beam energy loss, and a variety of other undesirable effects. The red beam 40 exits the prism 20 perpendicular to a fourth surface 42 to minimize undesirable distortion effects on the beam 40. Green light transmits through the surface 38 and exits the prism 20 perpendicular to a fifth surface 44 as a green beam 46.

Typically, the prism 20 is more effective at splitting unpolarized white light into separate frequency bands than a conventional cubic prism. This is primarily because the beams 22, 32 impinge on the surfaces 26, 38 at smaller i.e., closer to normal angles of incidence.

Figure 2:
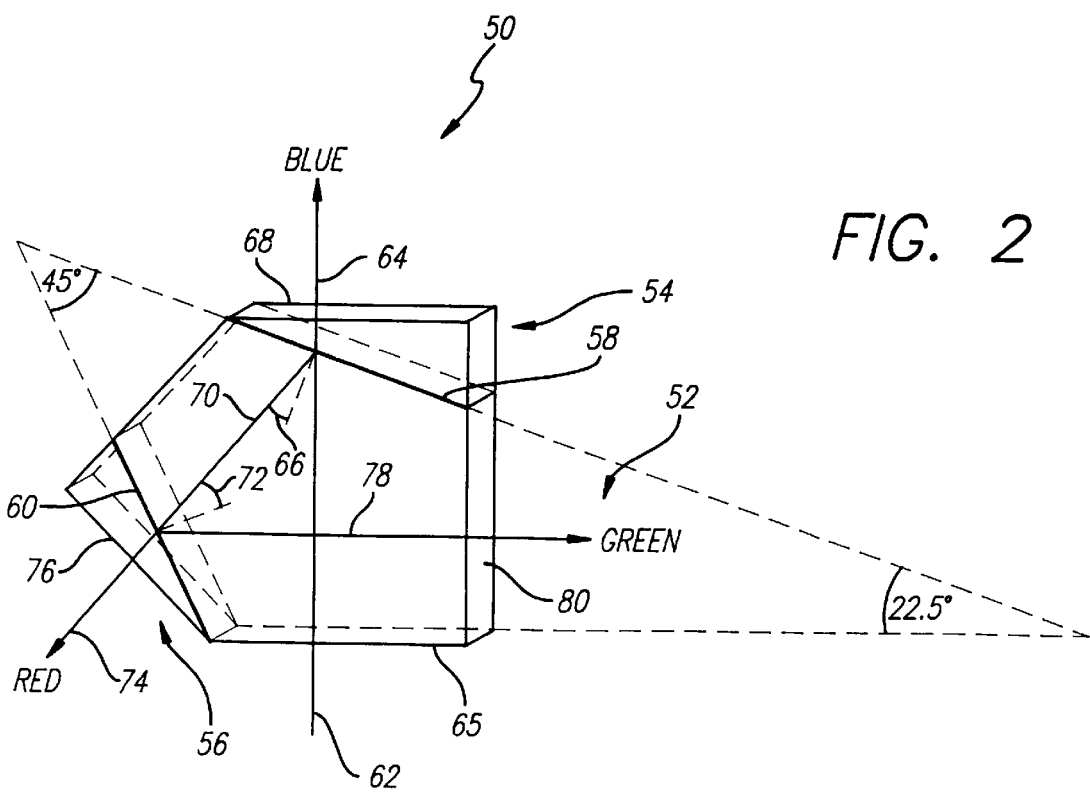
FIG. 2 is a diagram of a dichroic beamsplitter using a pentaprism and constructed in accordance with the teachings of the present invention.

FIG. 2 is a diagram of a dichroic beamsplitter 50 using a conventional pentaprism and constructed in accordance with the teachings of the present invention. The beamsplitter 50 includes a pentaprism 52, a first glass supporting triangular solid 54, and a second glass supporting rectangular solid 56. The beam splitter 50, pentaprism 52, and first and second solids 54 and 56 are constructed of optical grade glass or other suitable material. The first solid 54 is epoxied onto a green and red-reflecting dichroic surface 58 on one of the lateral surfaces of the pentaprism 52. This creates a glass-to-dichroic coating-to-glass interface at the surface 58. The second solid 56 is epoxied onto a green-reflecting dichroic surface 60 on the other lateral surface of the pentaprism 52. This creates a glass to dichroic coating to glass interface at the surface green-reflecting surface 60.

A beam of white light 62 enters the pentaprism 52 perpendicular to a first surface 65. The white beam 62 impinges on the red and green-reflecting surface 58 at a first angle of incidence 66 of 22.5 degrees. Blue light transmits through the surface 58 and into the first solid 54 as a blue beam 64. The blue beam 64 exits the beamsplitter 50 perpendicular to a second surface 68 on the first solid 54.

Green and red light from the white beam 62 reflect from the surface 58 as a green/red beam 70. The green/red beam 70 impinges on the green-reflecting surface 60 at a second 22.5 degree angle of incidence 72. Red light from the green/red beam 72 transmits through the second surface 60 and into the second triangular solid 56 as a red beam 74. The red beam 74 exits the beamsplitter 50 perpendicular to a third surface 76 on the second triangular solid 56. Green light from the green/red beam 72 reflects off the second surface 60 and into the pentaprism 52 as a green beam 78. The green beam 78 exits the beamsplitter 50 perpendicular to a fourth surface 80 on the pentaprism 52.

The triangular solids 54, 56 allow the beams 64, 74 to exit the beamsplitter 50 perpendicular to surfaces of the beamsplitter, for minimizing undesirable polarization degrees for minimizing undesirable polarization effects on the beams 62, 64, 70, 74, 78.

Those skilled in the art will appreciate beams of blue, green, and red light may be combined into white light by directing the different beams onto the second, third and fourth surfaces of the beamsplitter 50. Also, the dichroic surfaces 58, 60 may be interchanged. In addition, the red/green reflecting surface 58 may reflect or transmit another combination of colors, and the red-reflecting surface 60 may reflect another color without departing from the scope of the present invention.

Thus, the present invention has been described herein with reference to a particular embodiment for a particular application. Those having ordinary skill in the art and access to the present teachings will recognize additional modifications applications and embodiments within the scope thereof It is therefore intended by the appended claims to cover any and all such applications, modifications and embodiments within the scope of the present invention.

Accordingly,

What is claimed is:

1. A dichroic beamsplitter comprising:
    a first input surface approximately perpendicular to an input beam of light;
    a first dichroic surface mounted at a first angle with respect to said input aperture for transmitting light of a first color along a first path parallel to said input beam and for reflecting light of a second color and light of a third color;
    a second dichroic surface mounted at a second angle with respect to said input aperture for reflecting said light of a second color along a second path approximately perpendicular to said input beam and for reflecting said light of a third color along a third path angled approximately forty-five degrees with respect to said input beam; and
    a first output surface approximately perpendicular to said second path for outputting said light of a second color.

2. The invention of claim 1 wherein said first angle is approximately 22.5 degrees.

3. The invention of claim 1 wherein said second angle is approximately 77.5 degrees.

4. The invention of claim 1 further including a second output surface perpendicular to said first path for outputting said light of a first color perpendicular to said first output surface.

5. The invention of claim 4 further including a third output surface perpendicular to said third path for outputting said light of a third color perpendicular to said third output surface.

6. A system for separating frequency bands from a beam of electromagnetic energy having first, second and third frequency bands comprising:
    a first surface for transmitting said first frequency band and reflecting said second and third frequency bands;

a second surface, for reflecting said second frequency band and transmitting said third frequency band; and means including a pentaprism for supporting said first surface and said second surface in a predetermined orientation for providing a predetermined angle of incidence of electromagnetic energy impinging on said first surface and said second surface to minimize undesirable polarization effects.

7. The invention of claim 6 wherein said predetermined angle is approximately 22.5 degrees.

8. The invention of claim 6 wherein said predetermined orientation includes said first surface angled with respect to said second surface so that said first, second, and third frequency bands have first, second, and third separate paths respectively.

9. The invention of claim 6 wherein said predetermined orientation includes said first surface angled approximately forty-five degrees with respect to said second surface for minimizing undesirable polarization effects.

10. The invention of claim 6 wherein said first surface includes a dichroic coating on a first lateral surface of said pentaprism.

11. The invention of claim 10 wherein said second surface includes a dichroic coating on a lateral surface opposite said first lateral surface.

12. The invention of claim 11 wherein said means for supporting further includes first and second surface attachment means attached to said first and second surfaces respectively.

13. The invention of claim 12 wherein said first and second surface attachments and said pentaprism are constructed of optically equivalent materials.

14. The invention of claim 11 wherein said first, second, and third frequency bands correspond to blue, green, and red light.

15. The invention of claim 6 wherein said pentaprism is constructed of glass.

16. The invention of claim 6 wherein said first and second surfaces are disposed on said means for supporting.

17. The invention of claim 6 wherein said means for supporting includes a first surface perpendicular to said beam for receiving said beam.

18. The invention of claim 6 wherein said means for supporting is transparent.

19. The invention of claim 6 wherein said means for supporting has surfaces and said first, second, and third frequency bands pass through said surfaces perpendicular thereto.

20. The invention of claim 6 wherein said beam of electromagnetic energy is white light.

21. A system for separating frequency bands from a beam of electromagnetic energy including first, second and third frequency bands comprising:

a first surface for transmitting said first frequency band in a first direction, and reflecting said second and third frequency bands in a second direction different from said first direction;

a second surface, for reflecting said second frequency band in a third direction different from said first and second directions and transmitting said third frequency band in said second direction; and transparent means including a pentaprism for supporting said first surface at an angle with respect to said second surface for providing an angle of incidence of approximately 22.5 degrees for electromagnetic energy impinging on said first surface and said second surface to minimize undesirable polarization effects.

* * * * *